(12) United States Patent
Fay, II

(10) Patent No.: US 9,131,638 B2
(45) Date of Patent: Sep. 15, 2015

(54) INTERMEDIATE LIFT CYLINDER LOCK FOR EXTRA TALL STUBBLE BIOMASS OPERATION

(71) Applicant: CNH AMERICA, LLC, New Holland, PA (US)

(72) Inventor: Jeffrey Fay, II, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 213 days.

(21) Appl. No.: 13/872,839

(22) Filed: Apr. 29, 2013

(65) Prior Publication Data

US 2014/0318098 A1  Oct. 30, 2014

(51) Int. Cl.
*A01D 34/00* (2006.01)
*A01D 34/74* (2006.01)

(52) U.S. Cl.
CPC .............. *A01D 34/001* (2013.01); *A01D 34/74* (2013.01)

(58) Field of Classification Search
CPC ...... A01B 73/00; A01B 63/22; A01D 34/664; A01D 57/24; A01D 43/107; A01D 67/005; A01D 33/14
USPC ............. 56/15.2, 15.7, 228, 229, 15.8; 172/4, 172/311, 388, 452, 466, 572; 111/903, 926
See application file for complete search history.

(56) References Cited

U.S. PATENT DOCUMENTS

| | | | |
|---|---|---|---|
| 3,599,411 A * | 8/1971 | Scarnato et al. | 56/228 |
| 3,828,532 A * | 8/1974 | Fickle et al. | 56/14.4 |
| 4,073,345 A | 2/1978 | Miller | |
| 4,175,366 A * | 11/1979 | Cicci | 56/15.8 |
| 4,176,721 A * | 12/1979 | Poggemiller et al. | 172/4 |
| 4,177,625 A * | 12/1979 | Knight et al. | 56/13.6 |
| 4,177,627 A * | 12/1979 | Cicci | 56/15.8 |
| 4,187,664 A * | 2/1980 | Meek et al. | 56/13.6 |
| 4,418,517 A * | 12/1983 | Ehrhart et al. | 56/228 |
| 4,676,053 A * | 6/1987 | Pruitt | 56/208 |
| 4,719,742 A * | 1/1988 | Ermacora et al. | 56/16.4 R |
| 5,060,462 A * | 10/1991 | Helfer et al. | 56/14.9 |
| 5,107,663 A * | 4/1992 | Wattron et al. | 56/15.7 |
| 5,241,808 A | 9/1993 | Colistro | |
| 5,272,859 A * | 12/1993 | Pruitt et al. | 56/15.2 |
| 5,337,544 A * | 8/1994 | Lauritsen | 56/15.7 |
| 5,353,580 A | 10/1994 | Wolff | |
| 5,566,536 A | 10/1996 | Krafka et al. | |
| 5,566,537 A * | 10/1996 | Kieffer et al. | 56/15.2 |
| 5,642,607 A | 7/1997 | Stephenson et al. | |

(Continued)

FOREIGN PATENT DOCUMENTS

JP  10042654 A  2/1998

*Primary Examiner* — Árpád Fábián-Kovács
(74) *Attorney, Agent, or Firm* — Patrick M. Sheldrake; Seyed V. Sharifi T.

(57) ABSTRACT

A wheel lift assembly lockout mechanism for an agricultural mower having a lift cylinder for moving the mower frame between raised and lowered positions. The lockout mechanism is positioned adjacent to a rod end of a lift cylinder and is pivotable between generally opposing lockout and free positions. First and second stops interact with the lift cylinder depending upon the position of the lockout mechanism to provide at least two stop positions allowing minimum mower heights in each stop position to be established. The lockout mechanism further includes a bias apparatus and a lockout limiter to enable a specific lockout height to be imposed with minimal impact other operational aspects of the wheel lift assembly.

17 Claims, 6 Drawing Sheets

(56) References Cited

U.S. PATENT DOCUMENTS

| | | | |
|---|---|---|---|
| 5,806,291 A * | 9/1998 | Lehman et al. | 56/15.2 |
| 6,044,633 A * | 4/2000 | Stiefvater et al. | 56/16.4 R |
| 6,128,892 A | 10/2000 | Neuerburg et al. | |
| 6,250,055 B1 * | 6/2001 | Franet | 56/15.9 |
| 6,655,118 B1 * | 12/2003 | Thompson et al. | 56/15.8 |
| 6,758,284 B2 * | 7/2004 | Myers | 172/311 |
| 6,782,680 B2 * | 8/2004 | Viaud et al. | 56/13.6 |
| 7,055,300 B2 | 6/2006 | Wolff | |
| 7,162,854 B2 * | 1/2007 | Yeomans et al. | 56/14.9 |
| 7,987,656 B2 | 8/2011 | Erhart et al. | |
| 2003/0221401 A1 * | 12/2003 | Ligouy | 56/14.7 |
| 2007/0039304 A1 * | 2/2007 | Wright et al. | 56/14.9 |
| 2010/0051302 A1 | 3/2010 | Steffan et al. | |

* cited by examiner

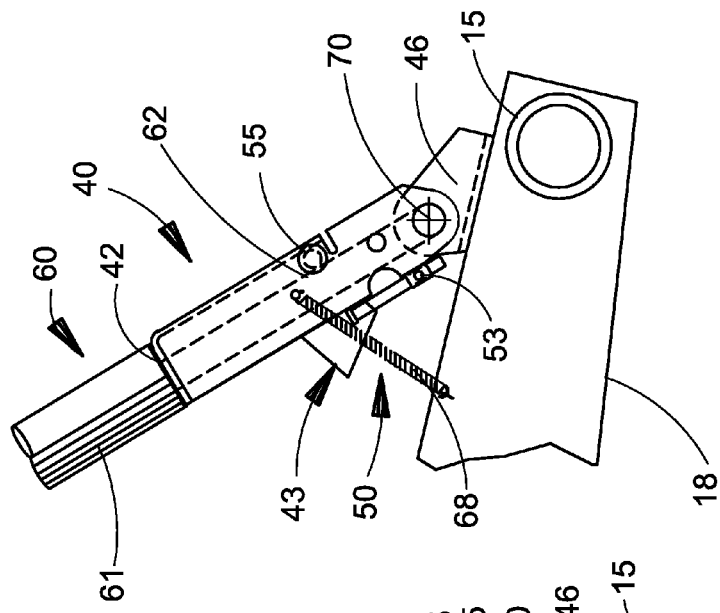
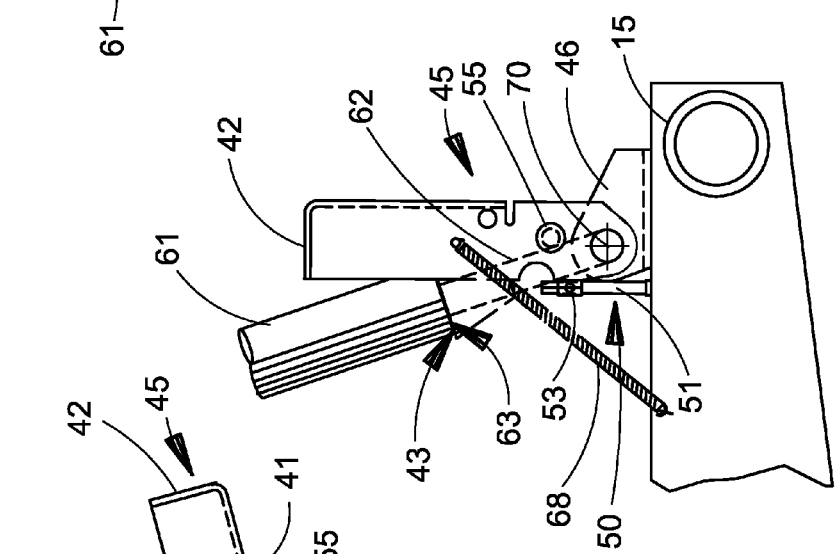
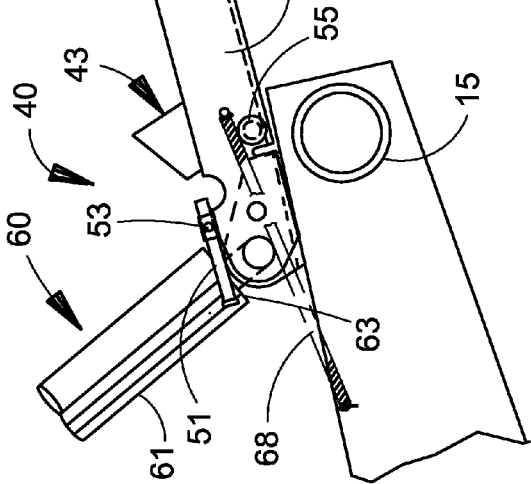

INTERMEDIATE LIFT CYLINDER LOCK FOR EXTRA TALL STUBBLE BIOMASS OPERATION

BACKGROUND OF THE INVENTION

The present invention relates generally to agricultural harvesting machines, and more particularly to a mechanism for conveniently vertically positioning an agricultural mower to an intermediate operating height.

Agricultural center-pivot mowers employ a ground-supported frame to which a floating mower header is connected. The mower header is permitted limited vertical movement in relation to the frame to allow the header to follow ground contours and sever a standing crop at a generally uniform height above the ground as the mower is towed through the crop. Mower frames also include height adjustment provisions to allow the mower header to be raised significantly, such as for transport over the road and returned to an operating height at which the header flotation provisions will function.

Emerging perennial grass biomass markets, such as switch grass and miscanthus, demand taller stubble for plant regrowth, nutrient density, and harvest equipment tire wear. Conventional center pivot disc mowers cannot provide adequate head flotation using the standard lift cylinder configuration while operating in biomass crops with extra tall skid shoes installed on the cutting header.

It would be advantageous to provide an improved height adjustment mechanism for a center pivot mower that would enable a user-selectable intermediate operating position between the normal operating height and the transport height for mower operations requiring elevated cut height. Further advantages would be realized by a height adjustment mechanism that is easily incorporated into the existing height adjustment of a center pivot mower.

SUMMARY OF THE INVENTION

According to one embodiment of the present invention, an agricultural mower having a lift cylinder moveable between raised and lowered positions to control height of a mower frame and a lockout mechanism movable between generally opposing lockout and free positions further includes an intermediate stop on the lockout mechanism to enable the lift cylinder to be locked out at an intermediate position between the raised and lowered positions.

In another embodiment of the present invention, an agricultural mower is provided with a lift cylinder for moving a mower frame between raised and lowered positions to control height of a connected mower assembly. A lockout mechanism positioned adjacent to a rod end of the lift cylinder is pivotable between generally opposing lockout and free positions. The lockout mechanism further includes an intermediate stop to engage the lift cylinder and limit rod retraction to an intermediate position between the raised and lowered positions. The lockout mechanism further includes a spring arranged to bias the mechanism toward the lockout position and a positioner to limit the pivotal motion of the lockout mechanism so that only the intermediate stop may be engaged by the cylinder.

In another embodiment of the present invention, an agricultural mower is provided with a lift cylinder for moving a mower frame between raised and lowered positions to control height of a connected mower assembly. A lockout mechanism positioned adjacent to a rod end of the lift cylinder is pivotable between generally opposing lockout and free positions. The lockout mechanism further includes an intermediate stop to engage the lift cylinder and limit rod retraction to an intermediate position between the raised and lowered positions. The lockout mechanism further includes a spring arranged to bias the lockout mechanism toward the lockout position and a positioner to limit the pivotal motion of the lockout mechanism so that only the intermediate stop may be engaged by the cylinder and preventing engagement of the fully raised lockout position.

Another embodiment of the present invention provides an agricultural mower with a lift cylinder for moving a mower frame between raised and lowered positions to control height of a connected mower assembly. A lockout mechanism in the form of an elongate channel member positioned adjacent to a rod end of the lift cylinder is pivotally connected at one end adjacent to the connection of the lift cylinder rod end to the frame. The lockout mechanism is moveable between generally opposing lockout and free positions. A travel stop on the end of the lockout mechanism opposite of the pivotal connection is positioned, when in the lockout position, to engage the lift cylinder in a manner to limit retraction of the rod into the lift cylinder. The lockout mechanism further includes an intermediate stop to engage the lift cylinder and limit rod retraction to an intermediate position between the raised and lowered positions when the lockout mechanism is positioned between the lockout and free positions. The channel member is durable in construction, inexpensive of manufacture, carefree of maintenance, easily assembled, and simple and effective to use.

Additional advantages and objectives of various aspects and embodiments of the present invention are discussed below.

BRIEF DESCRIPTION OF THE DRAWINGS

The advantages of this invention will be apparent upon consideration of the following detailed disclosure of the invention, especially when taken in conjunction with the accompanying drawings wherein:

FIG. 5 is a detail view of the lockout mechanism shown positioned for normal operation;

FIG. 6 is a detail view of the lockout mechanism shown positioned for tall stubble or intermediate lockout operation;

FIG. 7 is a detail view of the lockout mechanism shown positioned for full lockout or transport operation.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures. Alpha designations following a numeric designator are used to distinguish the two similar parts, typically right side/left side on the generally symmetrical invention; reference to the numeric designator alone indicates the either part.

Figure 1:
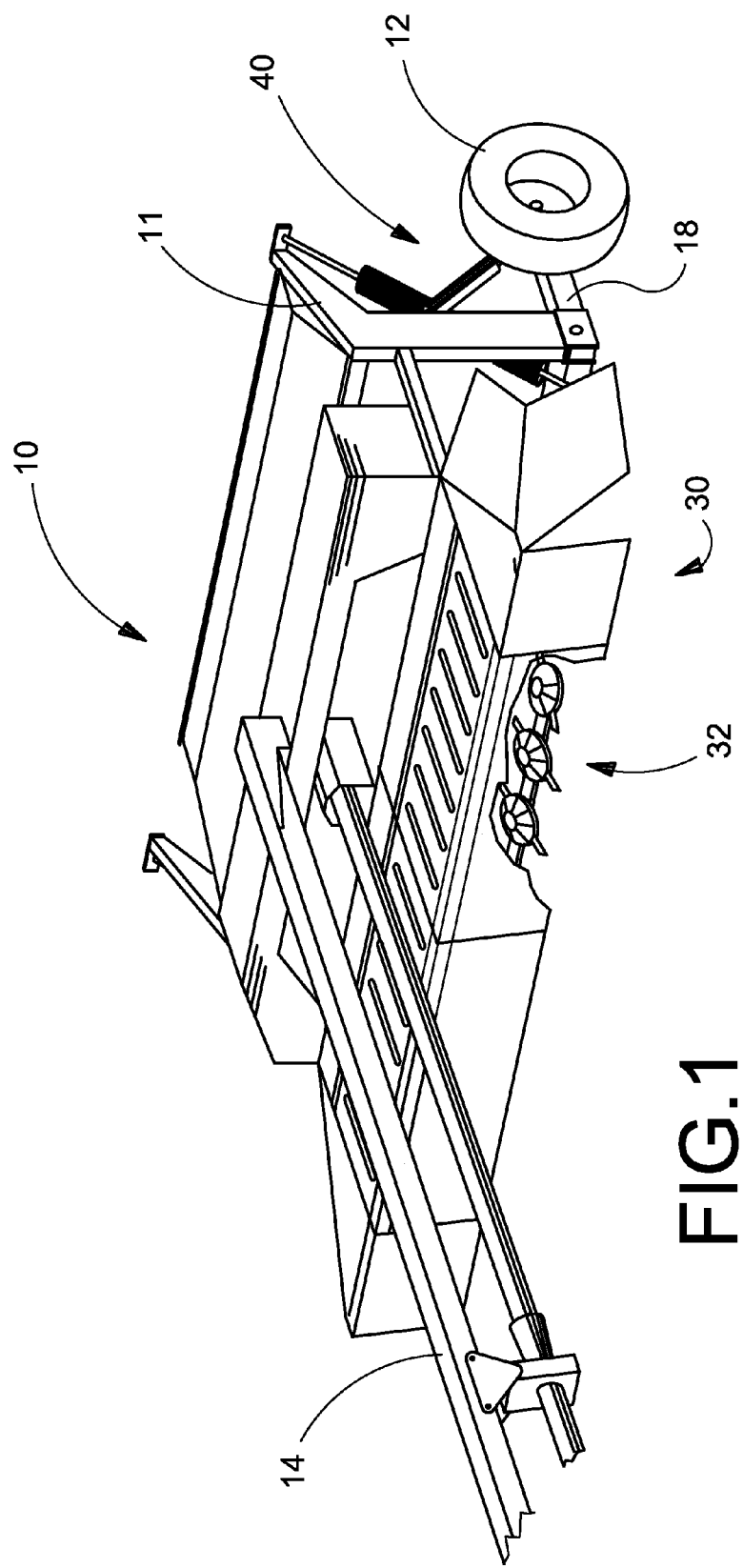
FIG. 1 is a perspective view of an agricultural pull-behind harvester of the type on which the present invention is useful.

Referring now to the drawings and particularly to FIG. 1, an agricultural mowing machine 10 incorporating the principles of the instant invention can best be seen. Mowing machine 10 as presented herein is what is generally known as a center-pivot, pull-behind mower-conditioner and is provided with a generally conventional movable frame 11 supported on the ground by a pair of transversely spaced-apart trailing wheels 12 and a draft tongue 14 configured for connection to a tractor, as is known in the art. A harvesting header 30 is operably connected to and supported by the frame 11 in a manner allow limited header flotation as the machine is pulled across the ground with the cutterbar 32 height being generally established by skid shoes 16 (see FIG. 2) mounted on the cutterbar contacting the ground. Trailing wheels 12 mounted on axles 15 affixed to a pair of movable trailing arms 18 whose position is managed by wheel lift assembly 40 to raise and lower the wheels relative to the frame 11 thereby enabling the vertical position of frame 11 and the supported header 30 to be adjusted relative to the ground. The wheel lift assembly 40 allows the implement 10 to be raised to clear obstructions or windrows and lowered to bring the attached header 30 operably close to the ground.

Figure 2:
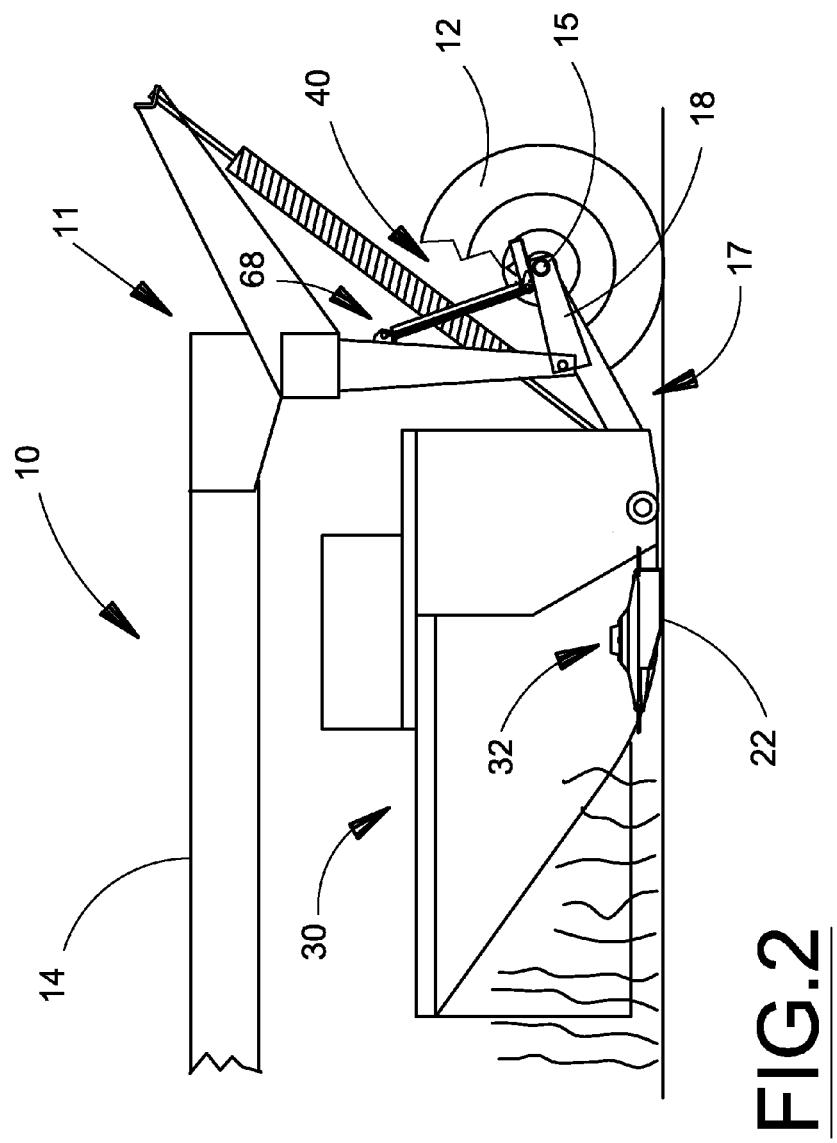
FIG. 2 is a partial side elevation view of the agricultural harvester shown in FIG. 1, wherein the harvester is shown configured for normal operation.
Figure 3:
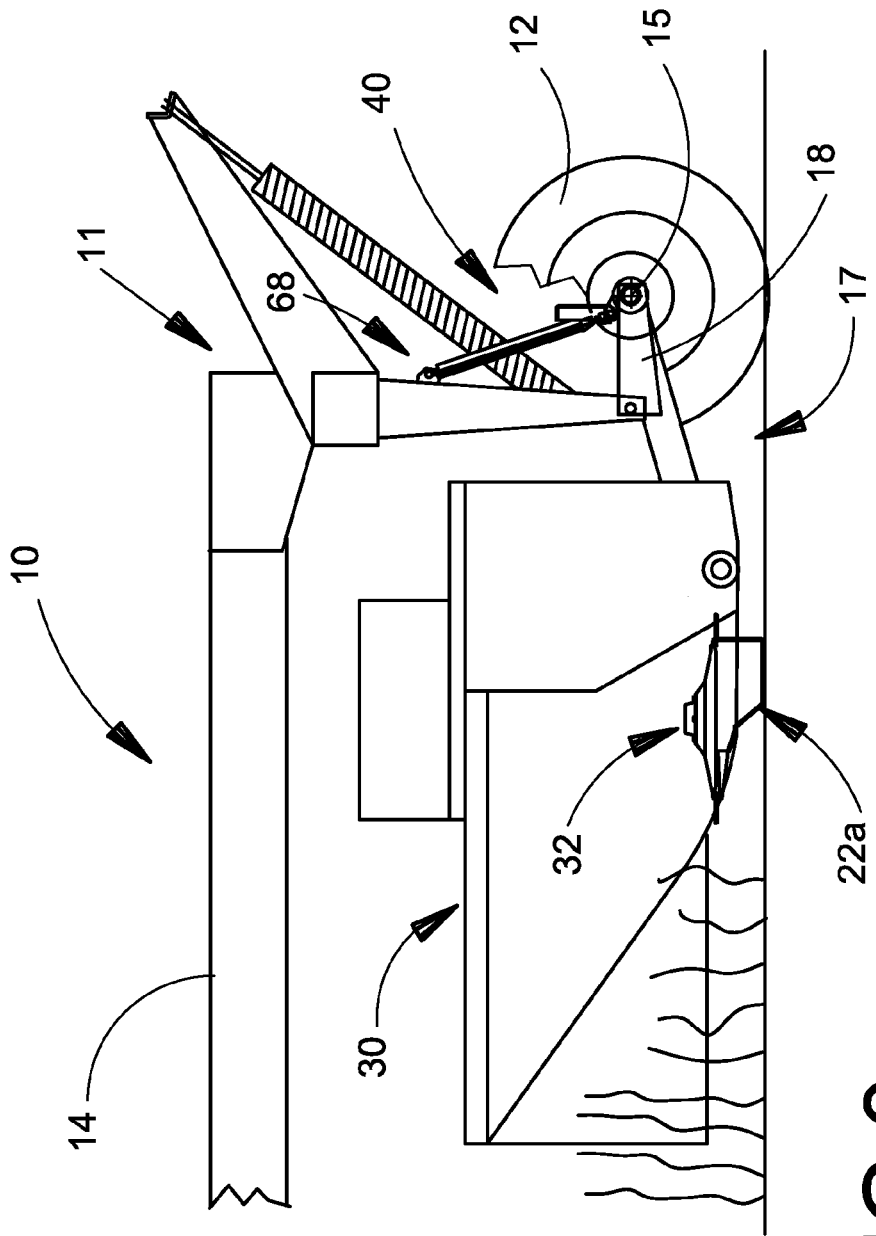
FIG. 3 is a partial side elevation view of the agricultural harvester shown in FIG. 1, wherein the harvester is shown configured for tall stubble operation.
Figure 4:
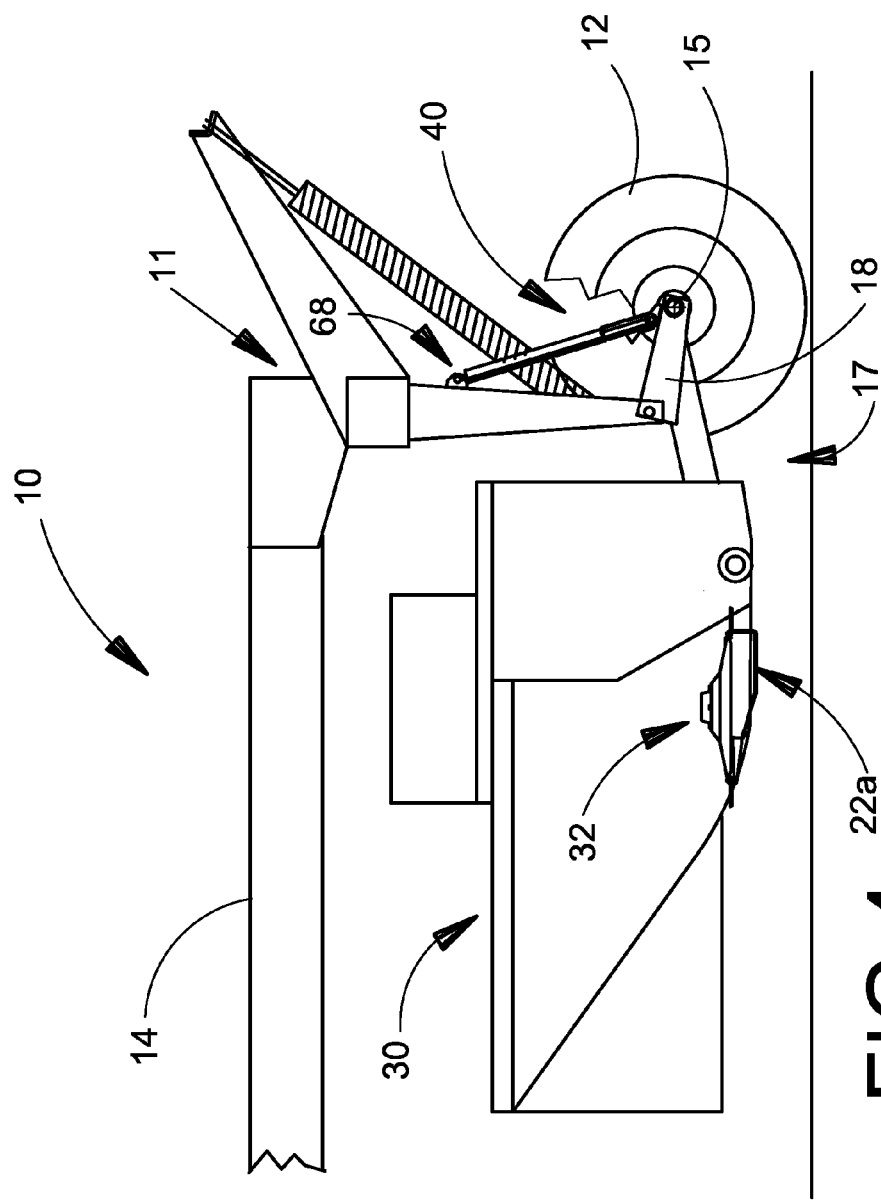
FIG. 4 is a partial side elevation view of the agricultural harvester shown in FIG. 1, wherein the harvester is shown configured for transport operation.
Figure 8:
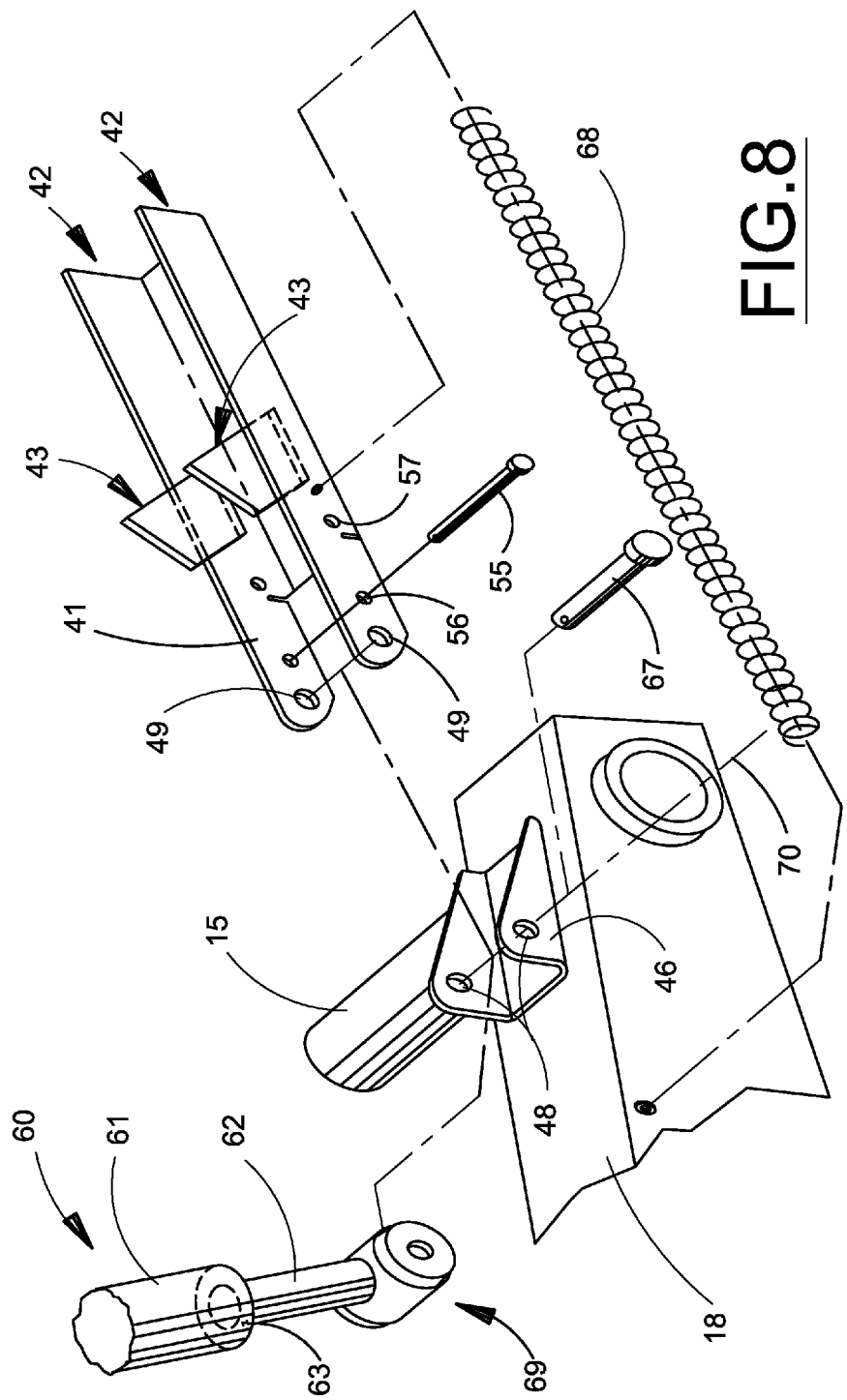
FIG. 8 is an exploded view of the lockout mechanism of the present invention.

FIGS. 2 through 4 illustrate the machine 10 positioned for normal operation (FIG. 2), tall stubble operation (FIG. 3), and transport operation (FIG. 4). For normal operation as shown in FIG. 2, a standard skid shoe 22 is fitted, typically to the lower side of the cutterbar 32. Header flotation linkage 17 allows limited header 30 movement relative to the machine frame 11 as the machine traverses uneven ground. In this configuration, the wheel lift assembly 40 is positioned to allow the frame 11 to be in its lowest position relative to the ground. For transport operation, shown in FIG. 4, or to elevate the header 30 as needed to clear an obstacle or cross an existing crop windrow, the wheel lift assembly 40 is extended to raise the frame 11 and connected header 30. The frame elevation exceeds the movement limits of the header flotation linkage 17 so that the header 30 is elevated as well.

When tall stubble operation is desired, tall skid shoes 22a are fitted to the header 30 to position the cutterbar 32 higher than the normal operational position provided by normal skid shoes 22. Some tall stubble crops require cutterbars to be positioned five or more inches above the ground. Positioning cutterbars at such heights exceeds the capabilities of the header flotation capability of the flotation linkage 17. Elevating the machine frame 11 using the wheel lift assembly 40 is one method for resolving the problem. The hydraulic cylinder typically used in wheel lift assembly is not well suited to maintaining the frame in an elevated intermediate position for an extended period of time nor does a conventional wheel lift assembly offer a convenient method for consistently positioning the frame to a pre-determined intermediate height.

Referring to FIGS. 5 through 8 in conjunction with FIGS. 2 through 4, a wheel lift assembly 40 incorporating the present invention comprises a lift actuator 60 having hydraulic chamber 61 and an extensible rod 62 extending therefrom. Movement of the rod 62 is controlled by varying hydraulic pressure on opposing sides of a piston (not shown) connection to an end of the rod 62 disposed within the cylinder as is well-known. The rod 62 is moveable between a fully extended limit and a fully retracted limit to alter the spacing between lift cylinder end connections 68, 69. End connections 68, 69, one connected to the frame 11 and the other connected to swing arm 18, enable changes in lift actuator 60 length (extension/retraction of the rod 62) cause the swing arm 18 to move in relation to the frame 11, changing the height of the frame 11 above the ground.

For extended operation in the raised transport mode, a lockout mechanism 45 is provided. In a preferred embodiment, lockout mechanism 45 comprises a C-shaped structural channel member 41 sized to permit the rod 62 to fit within the confines of the channel. The lockout mechanism 45 is pivotally connected to the swing arm 18 co-axially with the connection of the lift cylinder 60. In the embodiment illustrated, bracket 46 is connected to the swing arm 18 and a shared pin 67 engages holes 48 in the bracket 46, the end connector 69 of the rod 62, and holes 49 in the lockout mechanism 45 so that the rod 62 and the lockout mechanism 45 may pivot about a common axis 70.

The lockout mechanism 45 may be pivoted about the co-axial axis 70 between an unlocked position, shown in FIG. 5, and a locked position, shown in FIG. 7. When in the unlocked position, the lockout mechanism 45 does not inhibit or limit movement of the lift actuator 60 so that the actuator is permitted to move completely between its fully extended and fully retracted limits. When the lockout mechanism 45 is moved into the locked position, first stop surface 42 is positioned to contact the moveable end 63 of the hydraulic cylinder 61 as the lift actuator 60 is moving from the extended limit toward the retracted limit. Once the moveable end 63 contacts the first stop surface 42, further retraction of the hydraulic cylinder 61 is prevented, thereby defining a first stop position of the lift actuator 60. A spring 68 or the like is provided to bias movement of the lockout mechanism. An over-center relationship between the spring 68 and the pivot axis 70 enables the bias force to maintain the lockout mechanism in either the locked or unlocked position.

For operation in the tall stubble mode, the lockout mechanism 45 is provided with a second stop surface 43 positioned between the pivot axis 70 and the first stop surface 42. Second stop surface 43 is arranged to contact the moveable end 63 of the hydraulic cylinder 61 as the actuator 60 is being retracted when the lockout mechanism 45 is pivotally positioned in an intermediate position between the locked and unlocked positions, as illustrated in FIG. 6. Contact of the cylinder moveable end 63 with the second stop surface 43 allows the rod 62 to be retracted further into the hydraulic cylinder 61 than is possible with the lockout mechanism 45 in the locked position, but not as much as is permitted when the lockout mechanism 45 is in the unlocked position, thereby defining a second stop position or a tall stubble stop position.

The lockout mechanism 45 is held in the intermediate position by a lockout stop 50. The lockout stop 50 is necessary to prevent the spring 68 from moving the lockout mechanism fully into the locked position when the tall stubble mode of operation is desired. In one embodiment, the lockout stop comprises a pin 51 which is held in a bushing 53 connected to the lockout mechanism 45. As the lockout mechanism 45 pivots toward the locked position, the pin 51 contacts the swing arm and thus prevents further movement toward the locked position. The pin 51 may be slidingly positioned in the bushing 53 so that a length of a projected portion is variable. As the extended length in the direction of the swing arm 18 establishes the degree of pivotal motion of the lockout mechanism 45, an pre-determined intermediate position may be established. When the fully locked position of the lockout mechanism is required, such as for transport, the pin 51 can be repositioned so that it does not inhibit movement of the lockout mechanism 45 into the locked position. Alternatively, the pin 51 may be pivotally connected in lieu of the sliding bushing, allow the pin to be pivoted into a stop position or pivoted so that it does not contact the swing arm. A detent or spring-biased lever connected to the pin 51 provides for ease of operation. In this manner, the lift actuator 60 may be used to raise the machine frame to the fully raised or transport position, such as to clear an obstacle, and then return to the tall stubble position to resume tall stubble cutting operation. Other embodiments of the lockout stop may include a stop bolt in lieu of the pin or an insert 55 that is positioned within the channel 41, such as through holes 56 to prevent the channel from moving fully into the locked position. Storage holes 57 can be provided to store the insert 55 when normal lockout mechanism operation is desired.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A wheel lift assembly for an agricultural machine comprising:
    a moveable swingarm pivotally connected to the mower and having a wheel connected at a position spaced-apart from the pivot connection;
    an elongate lift cylinder having an extensible rod with an end connector interconnecting the mower and the swingarm, the extensible rod moveable relative to the cylinder between a retracted limit and an extended limit; and
    a lockout mechanism connected adjacent to the rod for pivotal movement between generally opposing locked and unlocked positions, the lockout mechanism engaging the cylinder and limiting retraction of the rod into the cylinder to a first stop position spaced apart from the retracted limit when in the locked position and allowing unrestricted movement of the rod between retracted and extended limits when in the unlocked position,
    the lockout mechanism further having an intermediate stop that engages the cylinder upon the lockout mechanism being positioned at an intermediate position, the intermediate position located between the locked and unlocked positions to limit retraction of the rod into the cylinder to a second stop position disposed between the extended limit and the first stop position,
    the second stop position to accommodate a head flotation of the agricultural machine for an operation thereof associated with a substantially tall stubble that requires substantially tall skid shoes for the agricultural machine.

2. The wheel lift assembly of claim 1, further comprising a positioning device for selectively maintaining the lockout mechanism in the locked, unlocked, or intermediate position.

3. The wheel lift assembly of claim 2, wherein the positioning device comprises a spring biasing the lockout mechanism toward the locked position or the unlocked position by an over-center placement of the lockout mechanism pivot relative to the spring, and a limiter device to selectively prevent movement of the lockout mechanism from the intermediate position toward the locked position.

4. The wheel lift assembly of claim 3, wherein the limiter device is a pin positionable between the lockout mechanism and the swingarm to inhibit pivotal movement of the lockout mechanism between the intermediate position and the lockout position.

5. The wheel lift assembly of claim 3, wherein the limiter device is a pivotable lever arm moveable between first and second positions that, when in the first position is disposed between the lockout mechanism and the swingarm to inhibit pivotal movement of the lockout mechanism between the intermediate position and the lockout position, and when in the second position allow uninhibited movement of the lockout mechanism between the locked and unlocked positions.

6. The wheel lift assembly of claim 1, wherein the lockout mechanism pivot and the rod end connector are coaxial.

7. A wheel lift limiting device for an agricultural machine, the machine including a lift cylinder having an extensible rod with an end connector moveable relative to the cylinder between a retracted limit position and an extended limit position, the limiting device comprising:
    a lockout mechanism having a proximal end and an opposing distal end, pivotally connected at the proximal end adjacent to a first end of the rod for pivotal movement between generally opposing locked and unlocked positions;
    a first stop disposed on the distal end of the lockout mechanism to engage the cylinder and limit retraction of the rod into the cylinder to a first stop position spaced apart from the retracted limit upon the lockout mechanism being in the locked position, the lockout mechanism allowing unrestricted movement of the rod between retracted and extended limits when in the unlocked position; and
    an intermediate stop disposed between the distal and proximal ends that engages the cylinder upon the mechanism is intermediately positioned between the locked and unlocked positions, the intermediate stop limiting retraction of the rod into the cylinder to a second stop position disposed between the extended limit and the first stop position,
    the second stop position to accommodate a head flotation of the agricultural machine for an operation thereof associated with a stubble harvest requirement being over five inches.

8. The limiting device of claim 7, wherein the lockout mechanism pivot and the rod end connector are coaxial.

9. The limiting device of claim 8, further comprising a positioning device for selectively maintaining the lockout mechanism in the locked, unlocked, or intermediate position.

10. The limiting device of claim 9, wherein the positioning device comprises a spring biasing the lockout mechanism toward the locked position or the unlocked position by an over-center placement of the lockout mechanism pivot relative to the spring, and a limiter device to selectively prevent movement of the lockout mechanism from the intermediate position toward the locked position.

11. The limiting device of claim 10, wherein the limiter device is a pin positionable between the lockout mechanism and the swingarm to inhibit pivotal movement of the lockout mechanism between the intermediate position and the lockout position.

12. The limiting device of claim 10, wherein the limiter device is a pivotable lever arm moveable between first and second positions that, when in the first position is disposed between the lockout mechanism and the swingarm to inhibit pivotal movement of the lockout mechanism between the intermediate position and the lockout position, and when in the second position allow uninhibited movement of the lockout mechanism between the locked and unlocked positions.

13. A lockout apparatus for a wheel lift mechanism on an agricultural machine, the wheel lift mechanism including a cylinder with a rod extending from an end thereof and moveable between opposing retracted limit and extended limit positions, the rod being pivotally connected to the machine:
 a lockout mechanism having a proximal end and an opposing distal end, the proximal end pivotally connected coaxial with the rod pivotal connection for movement between generally opposing locked and unlocked positions;
 a first stop disposed on the distal end of the lockout mechanism for engaging the cylinder end and limiting retraction of the rod into the cylinder to a first stop position spaced apart from the retracted limit position when the lockout mechanism is in the locked position, the lockout mechanism allowing unrestricted movement of the rod between retracted and extended limit positions when in the unlocked position; and
 an intermediate stop disposed between the distal and proximal ends of the lockout mechanism that engages the cylinder when the mechanism is intermediately positioned between the locked and unlocked positions, the intermediate stop engaging the cylinder end to limit retraction of the rod into the cylinder to a second stop position disposed between the extended limit position and the first stop position,
 the second stop position to accommodate a head flotation of the agricultural machine for an operation thereof associated with a substantially tall stubble that requires substantially tall skid shoes for the agricultural machine.

14. The lockout apparatus of claim 13, further comprising a positioning device for selectively maintaining the lockout mechanism in the locked, unlocked, or intermediate position.

15. The lockout apparatus of claim 14, wherein the positioning device comprises a spring biasing the lockout mechanism toward the locked position or the unlocked position by an over-center placement of the lockout mechanism pivot relative to the spring, and a limiter device to selectively prevent movement of the lockout mechanism from the intermediate position toward the locked position.

16. The lockout apparatus of claim 15, wherein the limiter device is a pin positionable between the lockout mechanism and the swingarm to inhibit pivotal movement of the lockout mechanism between the intermediate position and the lockout position.

17. The lockout apparatus of claim 15, wherein the limiter device is a pivotable lever arm moveable between first and second positions that, when in the first position is disposed between the lockout mechanism and the swingarm to inhibit pivotal movement of the lockout mechanism between the intermediate position and the lockout position, and when in the second position allow uninhibited movement of the lockout mechanism between the locked and unlocked positions.

\* \* \* \* \*